3,509,957
AXLE SUSPENSION FOR MOTOR VEHICLES WITH WHEELS SUPPORTED ON INCLINED GUIDE MEMBERS
Friedrich H. van Winsen, Kirchheim, Teck, and Erwin Loffler, Fellbach, Wurttemberg, Germany, assignors to Daimler-Benz Aktiengesellschaft, Stuttgart-Unterturkheim, Germany
Filed Sept. 29, 1967, Ser. No. 671,732
Claims priority, application Germany, Oct. 1, 1966, D 51,222
Int. Cl. B60k *17/00*
U.S. Cl. 180—73                                29 Claims

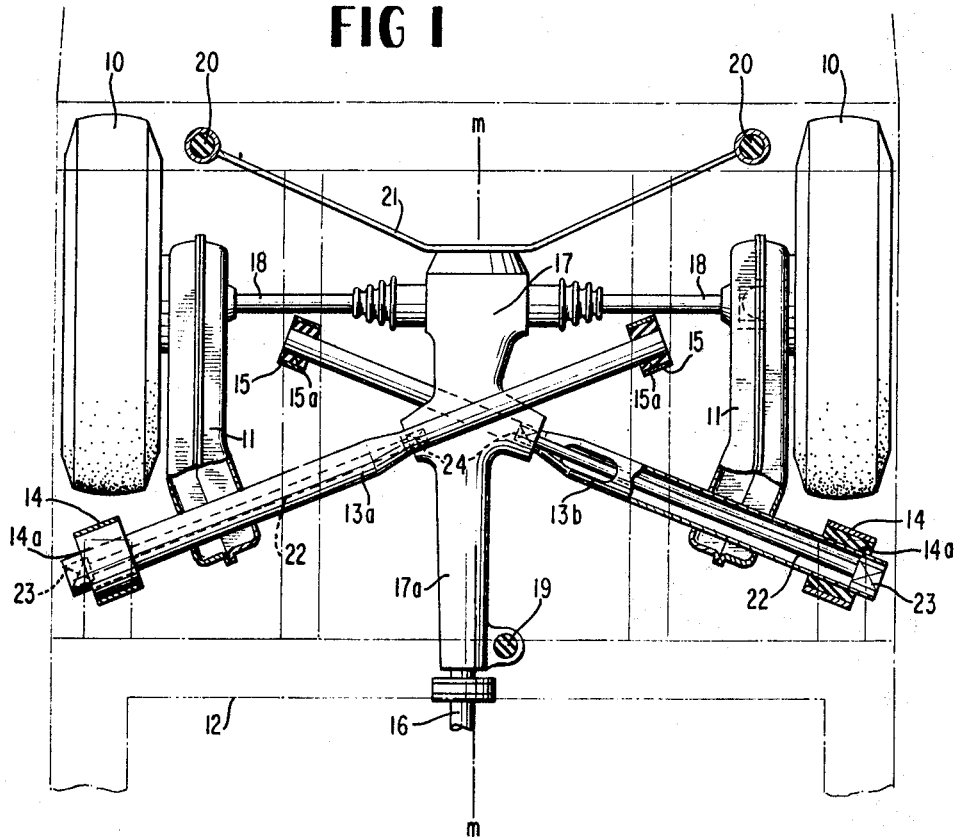
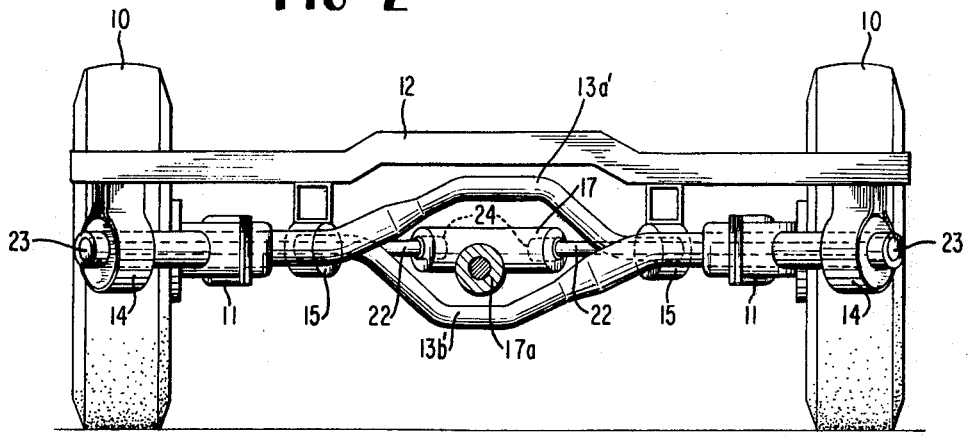
INVENTORS
FRIEDRICH H. VAN WINSEN
ERWIN LOFFLER
BY *Craig & Antonelli*
ATTORNEYS United States Patent Office 3,509,957
Patented May 5, 1970

ABSTRACT OF THE DISCLOSURE

An axle suspension for motor vehicles with wheels supported on inclined guide members, in which the inclined guide members are supported at the vehicle body or frame on a wide base by means of intersecting bearing axles, one bearing support for each bearing axle being arranged near the wheel and the other beyond the vertical longitudinal center plane of the vehicle as viewed from a respective wheel. The bearing axles are preferably constructed as hollow tubular elements offset in opposite directions within the area of the axle gear housing and accommodating over at least a portion of their extent, torsion rod springs for the spring support of the wheels.

Background of the invention

The present invention relates to an axle suspension, especially to a rear axle suspension, for motor vehicles with the wheels supported on inclined guide members, and aims above all at a good and stable roadability with a particularly safe and reliable absorption of the forces acting between the wheels and the vehicle body.

Summary of the invention

Accordingly, the present invention essentially consists in that the inclined guide members are each supported at the vehicle superstructure, over a large width with mutually crossing bearing axles, by means of a bearing support located in proximity to the wheel and of a bearing support arranged on the other side of the vertical llongitudinal center plane of the vehicle as viewed from a respective wheel. As a result of this mutually crossing arrangement of the inclined guide members, a bearing width is achieved which is under circumstances considerably larger than the distance of a wheel from the vertical longitudinal center plane of the vehicle. On the other hand, by the use of inclined guide members with mutually crossing or intersecting bearing axles, there are obtainable the known advantages of inclined members, which combine the properties of crank-axles, on the one hand, and swinging half-axles, on the other, as well as at the same time considerable structural advantages.

The moments acting at the wheel are absorbed about a vertical axis on a wide base by the broad support of the inclined guide members so that the forces in the bearing supports are reduced correspondingly. If the bearing supports are constructed as elastic or rubber bearings, the same can be constructed with relatively large rubber volumes so that the shocks are absorbed softly in the vertical direction without impairing in an unfavorable manner the kinematics of the wheel bearings or supports.

A further advantage of the axle arrangement according to the present invention resides in that during the drive over obstacles and therewith during spring deflections of the wheels, the occurring toe-in changes can be kept small by reason of the large base of the suspension points notwithstanding the large yieldingness of the outer bearing. By reason of the inclined arrangement of the bearing axles, the inner suspension bearings, remote from the wheels, can be arranged without difficulties in such a manner, notwithstanding the extension thereof to the opposite vehicle side, that they do not disturb each other. Thus, the two bearing supports of each inclined guide member may be arranged at the same height and at the same distance from the wheels and from the wheel center axis. The bearing axles are so offset in particular at the cross-over places that they by-pass the respective other bearing axle as well as possibly the axle drive extending in the longitudinal direction of the vehicle, or the axle gear housing. One of the two bearing axles may be extended thereby above the axle drive and the other below the axle drive with corresponding offset. Nevertheless, the bearing axles can be constructed interchangeably identical in that one is installed rotated by 180° with respect to the other bearing axle.

The wheel spring system is advantageously displaced into the bearing axles constructed as axle tubes, appropriately as torsion rods which extend out of the bearing axles, for example, at the offsets thereof and are clamped or held fast in the axle gear housing. The space otherwise needed for coil-springs or leaf-springs remains free thereby so that the luggage space can be constructed wider and—also with respect to the inclined arrangement of the bearing axles of the inclined guide members— more spacious, and the luggage space floor can be located lower. The possibility may also exist eventually to convert by corresponding arrangement of the backseats, a conventional limousine into a combination vehicle.

Furthermore, it can be achieved by the bearing support of the springs in the rear axle housing in front of the center axis of the wheels that the driving torque acts opposite to that torque which is introduced by way of the springs into the rear axle housing. The forces in the suspension points of the rear axle housing or of any other rear axle carrier are thereby reduced.

If the support base for the rear axle housing or the rear axle carrier is simultaneously selected correspondingly large, then the forces can be kept particularly small in the bearing places. Soft elastic or rubber bearings may also be used as a result thereof for the rear axle housing whereby the noise insulation is further improved.

Accordingly, it is an object of the present invention to provide an axle suspension for motor vehicles with inclined guide members which eliminates the aforementioned shortcomings and drawbacks encountered in the prior art constructions by simple means.

Another object of the present invention resides in an axle suspension for motor vehicles which assures good roadability as well as reliable absorption of the forces acting between the wheels and the vehicle body.

A further object of the present invention resides in an axle suspension for motor vehicles with inclined guide members in which the inclined guide members possess, in effect, a bearing width that is considerably larger than the distance of a wheel from the vertical longitudinal center plane.

Still a further object of the present invention resides in an axle suspension for motor vehicles which permits the attainment of considerable structural advantages while preserving the advantageous properties of the inclined guide members.

Another object of the present invention resides in an axle suspension for motor vehicles in which the forces within the bearings can be effectively reduced while the bearings themselves may be constructed with large rubber volume in order to absorb particularly softly impacts in the vertical direction without unfavorable influencing the kinematics of the wheel suspension.

A further object of the present invention resides in an axle suspension of the type described above which permits a lower luggage space bottom.

Still another object of the present invention resides in an axle suspension for motor vehicles using inclined guide members which improves the noise insulation of the body.

These and further objects, features, and advantages of the present invention will become more obvious from the following description when taken in connection with the accompanying drawing, which shows, for purposes of illustration only, one embodiment in accordance with the present invention, and wherein:

FIG. 1 is a top plan view on a rear axle in accordance with the present invention; and FIG. 2 is an end elevational view of the rear axle of FIG. 1, as viewed from in front thereof.

Referring now to the drawing wherein like reference numerals are used throughout the two views to designate like parts, the wheels 10 are suspended at the vehicle superstructure 12, for example, at the frame or body of the self-supporting-type vehicle, by means of inclined guide members 11. The inclined guide members 11 are composed of sheet metal stampings and are welded together with the tubularly shaped bearing axles 13a and 13b. The bearing axles 13a and 13b are supported at the vehicle superstructure 12, on the one hand, in bearings 14 arranged in proximity to the wheels, for example, approximately in the vertical center longitudinal plane of the wheels and, on the other, in bearings 15 remote from the wheels.

The drive of the wheels 10 takes place, for example, from a forwardly arranged engine, by way of axle drive means comprising the Cardan shaft 16 and the axle gear tube 17a which extends forwardly a large distance from the axis of rotation of the wheels. The wheels are driven by the driven axle means comprising the axle gear housing 17 and the double-jointed shafts 18. The axle gear housing 17 is supported at the vehicle superstructure 12, on the one hand, at a forward point 19 and, on the other, in two rear points 20 whereby the support in the two rear points 20 is effected by means of a cross member 21 which is rigidly connected with the axle gear housing 17 at the rear side thereof and is constructed, for example, as an upright or on-edge flat rod. The support in the three points 19, 20, 20 takes place preferably by means of rubber cushions which, by reason of the large base of these three support points can be constructed very soft.

Since the bearing axles 13a and 13b cross each other as well as the axle tube 17a of the axle gear housing 17, they are offset or cranked in their center area toward opposite sides as is particularly visible from FIG. 2 so that they are not impaired by the axle gear housing 17 also during the deflections of the wheels in which the offsets 13a' and 13b' participate. The offset or cranked sections have thereby preferably a smaller cross section than the sections of the bearing axles 13a and 13b which are not offset and which contain the torsion rods.

Torsion rods 22 serve for the spring support of the wheels which are clamped, on the one hand, at 23 to the outer end of a respective tubularly shaped bearing axle 13a and 13b and, on the other, at the inner ends thereof at 24 in the axle gear housing 17. For the purpose of bearing support in the axle gear housing 17, the torsion rods 22 extend out of the bearing axles 13a and 13b at the offsets thereof as is particularly visible from FIG. 2.

The bearings 14 and 15 are preferably constructed as rubber bearings. Since the bearings 14 have to absorb the main forces, especially the spring forces as well as the thrust forces acting at the wheels, the rubber elements 14a are correspondingly large whereas the bearings 15 can be kept relatively small with the rubber elements 15a thereof.

An extraordinarily stable axle suspension with slight undesirable wheel movements can be achieved notwithstanding soft rubber bearings as well as a very noise-free axle drive by reason of the large distance of the bearings 14 and 15 of a respective bearing axle 13a and 13b from one another as well as by the large base of the suspension points 19, 20 for the axle gear housing 17 which is utilized simultaneously for the absorption of the spring forces.

The bearing axles 13a and 13b can be constructed interchangeably identical. The same is also true with corresponding bearing support for the torsion rod springs.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as would be apparent to one with ordinary skill in the pertinent technology.

We claim:

1. An axle suspension, especially a rear axle suspension for motor vehicles having driven axle means and axle drive means for driving said driven axle means, a vehicle superstructure and means for supporting the wheels thereby, said means for supporting the wheels being disposed substantially in the longitudinal direction of the vehicle and extending essentially exclusively on one side of a vertical transverse plane including the wheel centers, said means comprising, for each wheel respectively, an inclined guide means, bearing axle means supporting said inclined guide means, extending from a respective wheel to one side of said transverse plane for the exclusive support of said wheel by said inclined guide means, said axle drive means disposed onto said one side of said transverse plane, means for supporting said bearing axle means exclusively to said one side of said transverse plane, at the vehicle superstructure, including two bearing support means disposed on different sides of a longitudinal vertical center plane of the vehicle, said bearing axle means being disposed in an inclined relationship to the longitudinal direction of the vehicle, a bearing portion of said bearing axle means being rotatably supported within each of said two bearing support means.

2. An axle suspension according to claim 1, wherein said axle drive means extends generally in the longitudinal direction, one of said bearing axle means extending above the axle drive means, and the other bearing axle means extending below the axle drive means with approximately the same offset as the one bearing axle means.

3. An axle suspension according to claim 2, wherein said bearing axle means are constructed hollow, and torsion rod means for spring-supporting the wheels which are arranged on the inside of the hollow bearing axle means and extend out of the same at the offsets thereof.

4. A wheel suspension according to claim 3, wherein the torsion rod means are clamped at the end thereof remote from the respective wheel in an axle gear housing forming part of the axle drive means.

5. A wheel suspension according to claim 1, wherein the first bearing support means of the bearing axle means have a larger diameter than the second bearing support means.

6. An axle suspension according to claim 5, wherein the bearing support means are constructed as elastic bearings.

7. An axle suspension according to claim 1, wherein said bearing axle means are tubularly-shaped, said inclined guide means consisting of sheet metal stampings welded together with said tubularly-shaped bearing axle means.

8. An axle suspension according to claim 1, wherein the bearing axle means of the two inclined guide means are interchangeably identical.

9. An axle suspension according to claim 1, wherein the bearing support means are constructed as elastic bearings.

10. An axle suspension according to claim 1, further comprising an axle gear housing and means for suspending the axle gear housing at the vehicle superstructure at three points which are spaced relatively far from each other.

11. An axle suspension according to claim 10, wherein the axle gear housing is suspended at the superstructure, on the one hand, at the forward end of an axle tube connected with the axle gear housing and, on the other, at the ends of a rear cross member connected with the axle gear housing.

12. An axle suspension according to claim 11, wherein the cross member is in the form of an upright flat rod.

13. An axle suspension according to claim 11, wherein the vehicle includes axle drive means extending generally in the longitudinal direction, one of said bearing axle means extending above the axle drive means, and the other bearing axle means extending below the axle drive means with approximately the same offset as the one bearing axle means.

14. An axle suspension according to claim 13, wherein said bearing axle means are constructed hollow, and torsion rod means for spring-supporting the wheels which are arranged on the inside of the hollow bearing axle means and extend out of the same at the offsets thereof.

15. A wheel suspension according to claim 14, wherein the torsion rod means are clamped at the end thereof remote from the respective wheel in an axle gear housing forming part of the axle drive means.

16. An axle suspension according to claim 15, wherein the offset sections of the tubularly shaped bearing axle means have a smaller diameter than the sections thereof accommodating the torsion rod means.

17. An axle suspension according to claim 1, wherein one of said bearing support means associated with a respective wheel is arranged approximately in the vertical longitudinal center plane of said wheel.

18. An axle suspension especially a rear axle suspension for motor vehicles having a vehicle superstructure and wheels supported on inclined guide means, wherein the improvement comprises support means for supporting the inclined guide means at the vehicle superstructure on a large width including mutually crossing bearing axle means, and for each inclined guide means, first bearing support means near a respective wheel and second bearing support means on the other side of the longitudinal center plane of the vehicle as viewed from a respective wheel, wherein the first bearing support means is arranged approximately in the vertical longitudinal center plane of a respective wheel.

19. A wheel suspension according to claim 18, wherein the first bearing support means of the bearing axle means have a larger diameter than the second bearing support means.

20. An axle suspension according to claim 19, wherein the bearing support means are constructed as elastic bearings.

21. An axle suspension according to claim 18, wherein said inclined guide means consist of sheet metal stampings welded together with tubularly shaped bearing axle means.

22. An axle suspension according to claim 21, wherein the bearing axle means of the two inclined guide means are interchangeably identical.

23. An axle suspension, especially a rear axle suspension for motor vehicles having a vehicle superstructure and wheels supported on inclined guide means, wherein the improvement comprises support means for supporting the inclined guide means at the vehicle superstructure on a large width including mutually crossing bearing axle means, and for each inclined guide means, first bearing support means near a respective wheel and second bearing support means on the other side of the longitudinal center plane of the vehicle as viewed from a respective wheel, wherein the vehicle includes axle drive means extending generally in the longitudinal direction, one of said bearing axle means extending above the axle drive means, and the other bearing axle means extending below the axle drive means with approximately the same offset as the one bearing axle means.

24. An axle suspension according to claim 23, wherein said bearing axle means are constructed hollow, and torsion rod means for spring-supporting the wheels which are arranged on the inside of the hollow bearing axle means and extend out of the same at the offsets thereof.

25. A wheel suspension according to claim 24, wherein the torsion rod means are clamped at the end thereof remote from the respective wheel in an axle gear housing forming part of the axle drive means.

26. An axle suspension according to claim 25, wherein the offset sections of the tubularly shaped bearing axle means have a smaller diameter than the sections thereof accommodating the torsion rod means.

27. An axle suspension according to claim 23, further comprising an axle gear housing and means for suspending said axle gear housing at the vehicle superstructure at three points which are spaced relatively far from each other.

28. An axle suspension according to claim 27, wherein the axle gear housing is suspended at the superstructure, on the one hand, at the forward end of an axle tube connected with the axle gear housing and, on the other, at the ends of a rear cross member connected with the axle gear housing.

29. An axle suspension according to claim 28, wherein the cross member is in the form of an upright flat rod.

References Cited

UNITED STATES PATENTS 2,198,099  4/1940  White.
2,755,875  7/1956  Muller.

A. HARRY LEVY, Primary Examiner

U.S. Cl. X.R.
280—124